(12) United States Patent
Rao et al.

(10) Patent No.: US 6,568,357 B1
(45) Date of Patent: May 27, 2003

(54) VARIABLE COMPRESSION RATIO PISTONS AND CONNECTING RODS

(75) Inventors: V. Durga Nageswar Rao, Bloomfield Twp.; Daniel Joseph German; Gary Allan Vrsek, both of Brighton; Jeffrey Eliot Chottiner, Farmington Hills; Mark Michael Madin, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 235 days.

(21) Appl. No.: 09/691,286

(22) Filed: Oct. 18, 2000

(51) Int. Cl.[7] ................................ F02B 75/04
(52) U.S. Cl. .................... 123/48 B; 123/78 E
(58) Field of Search ................ 123/48 B, 78 E

(56) References Cited

U.S. PATENT DOCUMENTS

| | | |
|---|---|---|
| 1,610,137 A | * 12/1926 | Kratsch ............... 123/78 E |
| 1,875,180 A | 8/1932 | Rider |
| 2,376,214 A | 5/1945 | Webster |
| 3,633,429 A | 1/1972 | Olson |
| 4,124,002 A | * 11/1978 | Crise ............... 123/78 E |
| 4,300,405 A | 11/1981 | Szczepanek |
| 4,510,895 A | 4/1985 | Slee ............... 123/48 B |
| 4,517,931 A | 5/1985 | Nelson ............... 123/48 B |
| 4,687,348 A | 8/1987 | Naruoka et al. |
| 4,979,427 A | 12/1990 | Pfeffer et al. |
| 5,247,011 A | * 9/1993 | Nenicka ............... 123/48 B |
| 5,562,068 A | 10/1996 | Sugimoto et al. ............... 123/48 B |
| 5,755,192 A | 5/1998 | Brevick ............... 123/78 B |

* cited by examiner

Primary Examiner—M McMahon

(57) ABSTRACT

Various embodiments (20; 50; 50; 120) of variable length piston and connecting rod assemblies for imparting a variable compression ratio to an internal combustion engine. The embodiments incorporate novel arrangements of relatively movable parts (32, 34; 60, 62; 84, 86; 124, 126) related by various elastomeric elements (38; 58; 96, 104; 136) and oil passages (42; 116, 118; 140, 142) to change compression ratios.

4 Claims, 3 Drawing Sheets

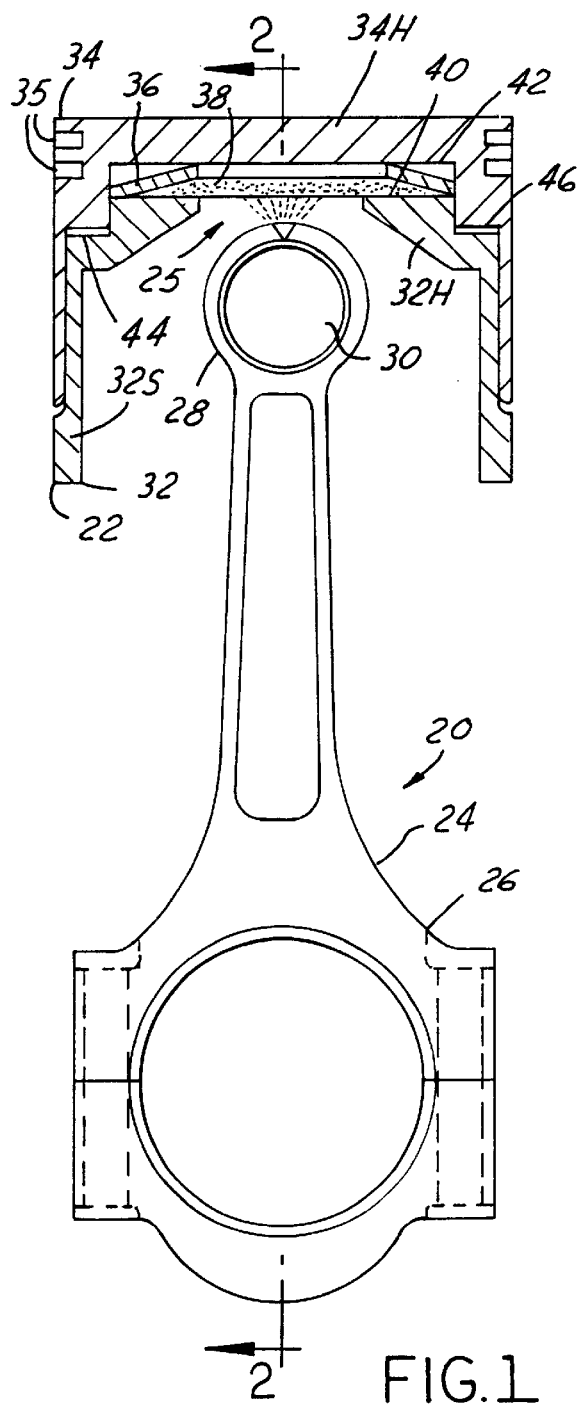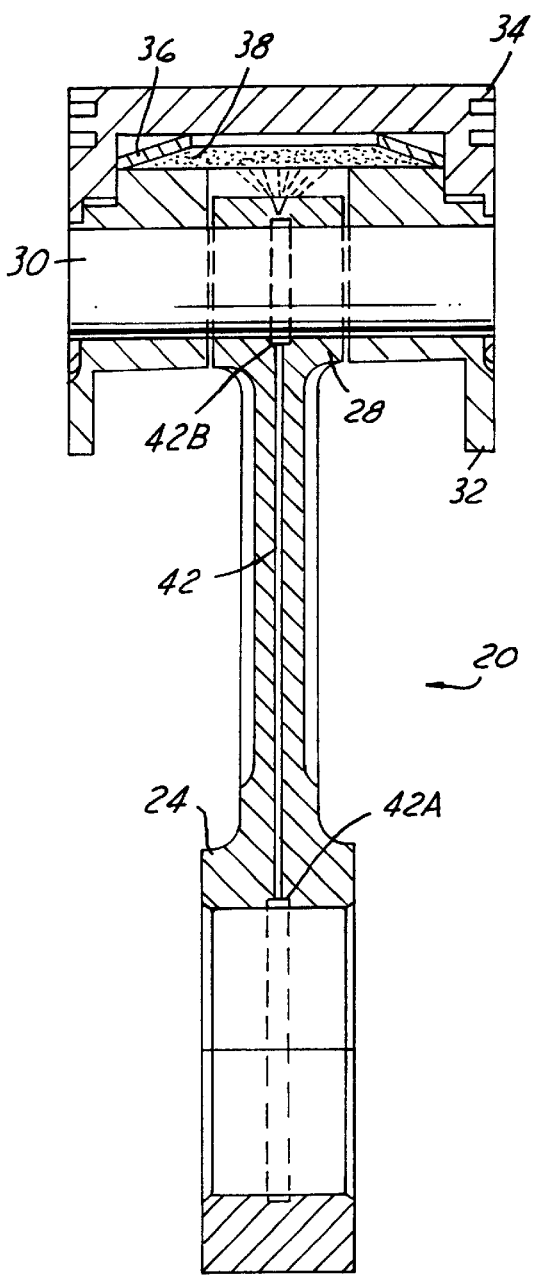

VARIABLE COMPRESSION RATIO PISTONS AND CONNECTING RODS

BACKGROUND OF THE INVENTION

1. Field of the Invention

This invention relates generally to reciprocating piston type internal combustion (I.C.) engines for motor vehicles. More specifically it relates to I.C. engines having variable compression ratio pistons and connecting rods.

2. Background Information

A gasoline engine whose compression ratio remains invariant as operating conditions change is said to be knock-limited. This means that the compression ratio built into the engine design must be selected to avoid objectionable engine knock that would otherwise occur during certain conditions of engine operation if the compression ratio were larger. However, those conditions that give rise to engine knocking in a motor vehicle typically prevail for only limited times as the vehicle is being driven. At other times, the engine could operate with better efficiency, and still without knocking, if the compression ratio could be made higher, but unfortunately the engine is incapable of achieving more efficient operation during those times because its compression ratio cannot change.

Certain technologies relating to reciprocating piston I.C. engines having variable compression ratio pistons and connecting rods are disclosed in various patents, including U.S. Pat. Nos. 1,875,180; 2,376,214; 4,510,895; 4,687,348; 4,979,427; 5,562,068; and 5,755,192. Various reasons for employing such technologies in I.C. engines have been advanced in those documents. One reason is to improve efficiency by enabling an engine that is relatively more lightly loaded to run at a compression ratio that is higher than a compression ratio at which the engine operates when running relatively more heavily loaded.

The compression ratio of an engine can be varied by varying the overall effective length of a connecting rod and piston. Change in overall effective length may be accomplished in either the connecting rod, or the piston, or in both. The foregoing patents describe various mechanisms for varying overall effective length.

SUMMARY OF THE INVENTION

The present invention relates to further improvements in construction of connecting rods and pistons in reciprocating piston I.C. engines for varying engine compression ratios as engine operating conditions change. Various embodiments of the invention are disclosed.

According to a first disclosed embodiment, a variable length piston and connecting rod assembly for imparting a variable compression ratio to an internal combustion engine comprises a first part and a second part that are coupled by a variable length mechanism that is captured between the parts, wherein the variable length mechanism comprising a frustoconical spring washer, and an elastomeric mass disposed against a concave face of the washer.

According to a second disclosed embodiment, a variable length piston for imparting a variable compression ratio to an internal combustion engine comprises a first part and a second part that are coupled by a variable length mechanism. The first part comprises a head and a stem extending from a central region of the head, and the second part comprises a surface with which the stem of the first part has a telescopic fit. An elastomeric mass is captured between confronting surfaces of the first and second parts surrounding the stem.

According to a third disclosed embodiment, a variable length piston and connecting rod assembly for imparting a variable compression ratio to an internal combustion engine comprises a first part and a second part that are coupled by a variable length mechanism that is captured between the parts. The first part comprises a blind hole, and an elastomeric mass comprising a ring is disposed in the blind hole. A first piston comprising a head is disposed in the blind hole above the elastomeric ring and has a stem that passes through the ring. A second piston comprising a head is disposed in the blind hole above the head of the first piston. A closure closing the blind hole captures the heads of the pistons but comprising a central through-hole, and the second piston comprising a stem that passes from its head through the closure through-hole to attach to the second part. An elastomeric mass is captured axially between the second part and the closure.

According to a fourth disclosed embodiment, a variable length piston and connecting rod assembly for imparting a variable compression ratio to an internal combustion engine comprises a first part and a second part that are coupled by a variable length mechanism that is captured between the parts. The first part comprises a blind hole, and an elastomeric mass is disposed in the blind hole. A piston is disposed in the blind hole above the elastomeric mass, and a closure closes the blind hole to capture the piston but comprises a central through-hole. The second part passes through the closure through-hole to attach to the piston. Oil passages supply oil to, and return oil from, a space in the blind hole below the elastomeric mass.

BRIEF DESCRIPTION OF THE DRAWINGS

The drawings that will now be briefly described are incorporated herein to illustrate a preferred embodiment of the invention and a best mode presently contemplated for carrying out the invention.

FIG. 1 is view of a first embodiment, comprising a piston and connecting rod, shown partly in cross section through an engine cylinder looking along a main axis of an engine.

FIG. 2 is view in the direction of arrows 2—2 in FIG. 1.

DESCRIPTION OF THE PREFERRED EMBODIMENT(S)

Figure 3:
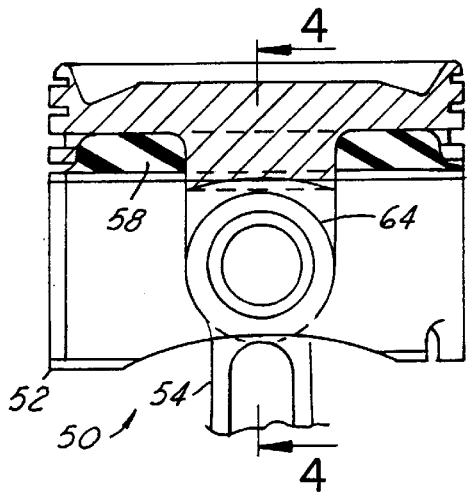
FIG. 3 is fragmentary view in the same direction as the view of FIG. 1, but showing a modified form constituting a second embodiment.

FIGS. 1 and 2 disclose a first piston/connecting rod embodiment 20, comprising a piston 22 and a connecting rod 24, for endowing an engine with a variable compression ratio by embodying a variable length mechanism 25 in piston 22.

Connecting rod 24 comprises a large end 26 for journaling on a crank pin of a crankshaft (not shown) and a small end 28 for journaling on a central portion of a wrist pin 30 that couples the connecting rod to piston 22. Connecting rod 24 has a fixed length between the centers of its large and small ends, and it connects piston 22 with the crank pin to relate reciprocal motion of piston 22 to rotary motion of the crankshaft.

Piston 22 comprises a first part 32 and a second part 34. Each part may be considered to have a respective head 32H, 34H, and a respective skirt 32S, 34S. Wrist pin 30 connects the connecting rod small end 28 only to part 32 so that the travel of part 32 within the engine cylinder is exactly equal to the stroke of connecting rod 24. Part 34 telescopically fits over part 32 in a manner that provides for limited variation in the extent of telescopic engagement as the engine operates. Head 34H of part 34 is solid, and contains piston rings grooves 35 around the outside. Skirt 34S telescopes over skirt 32S of part 32, but without interference with the connection of wrist pin 30 to the latter.

Parts 32 and 34 are coupled together through variable length mechanism 25 which comprises a frustoconical spring washer 36 and an annular elastomeric mass 38 cooperatively associated with the two parts 32, 34 in a manner that allows limited telescopic motion of part 34 on part 32. Washer 36 is disposed concentric with the cylinder axis and is axially captured between confronting faces 40 and 42 respectively of parts 32 and 34 respectively. Washer 36 is concave toward surface 40, and elastomeric mass 38 is disposed between the concave face of washer 36 and surface 40. Connecting rod 24 contains an oil passage 42 through which lubrication may be delivered from a groove 42A in the large end of the connecting rod around the crank pin to a groove 42B in the small end around the wrist pin. Lubrication is channeled from groove 42B against a central region of mechanism 25.

FIGS. 1 and 2 show a nominal overall free length for embodiment 20 when both washer 36 and mass 38 are relaxed. At times in the engine operating cycle, pressure in the displacement volume of the engine cylinder within which piston 22 reciprocates may rise sufficiently to move part 34 toward increased telescopic engagement with part 32. That motion reduces the overall effective length of the piston/connecting rod combination, and inherently reduces the engine compression ratio in the process. At lower pressures in the displacement volume, the inherent resiliency of washer 36 and elastomeric mass 38 restores the nominal overall effective length, inherently returning the compression ratio to its nominal value. The extent to which the compression ratio can be reduced is limited by abutment of stop surfaces 44 and 46.

Figure 4:
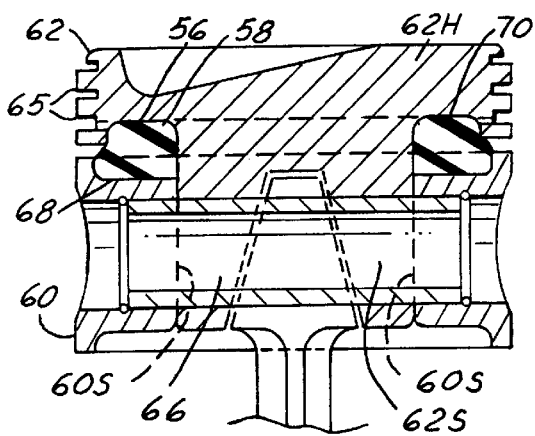
FIG. 4 is view in the direction of arrows 4—4 in FIG. 3.

FIGS. 3 and 4 disclose a second piston/connecting rod embodiment 50, comprising a piston 52 and a connecting rod 54, for endowing an engine with a variable compression ratio by embodying a variable length mechanism 56 in piston 52. Embodiment 50 comprises only an elastomeric mass 58 coupling first and second piston parts 60, 62. Connecting rod 54 comprises a large end (not appearing in the Figures) for journaling on a crank pin of a crankshaft (also not appearing) and a small end 64 for journaling on a central portion of a wrist pin 66 that couples the connecting rod to piston 52. Connecting rod 54 has a fixed length between the centers of its large and small ends, and it connects piston 52 with the crank pin to relate reciprocal motion of piston 52 to rotary motion of the crankshaft.

Wrist pin 66 connects the connecting rod small end 64 only to part 60 so that the travel of part 60 within the engine cylinder is exactly equal to the stroke of connecting rod 54. Part 62 telescopically engages part 60 in a manner that provides for limited variation in the extent of telescopic engagement as the engine operates. Part 62 comprises a solid head 62H and a stem 62S that extends from a central region of head 62H. Head 62H contains piston rings grooves 65 around its outside. Part 60 comprises a ring that has an interior surface 60S within which stem 62S telescopically fits, but without interference with the connection of wrist pin 66 to part 60.

Elastomeric mass 58 is cooperatively associated with parts 60, 62 in a manner that allows limited telescopic motion of part 62 relative to part 60. It is disposed between confronting faces 68 and 70 respectively of parts 60 and 62 respectively.

At times in the engine operating cycle, pressure in the displacement volume of the engine cylinder within which piston 52 reciprocates may rise sufficiently to move part 62 toward increased telescopic engagement with part 60. That motion reduces the overall effective length of the piston/connecting rod combination, and inherently reduces the engine compression ratio in the process. At lower pressures in the displacement volume, the inherent resiliency of elastomeric mass 58 restores the nominal overall effective length, inherently returning the compression ratio to its nominal value.

Figure 5:
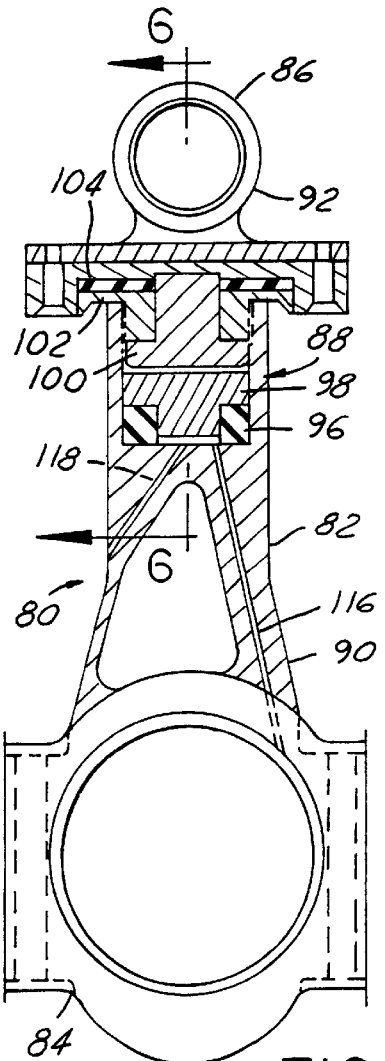
FIG. 5 is a view in the same direction as the view of FIG. 1 showing a connecting rod constituting a third embodiment.
Figure 6:
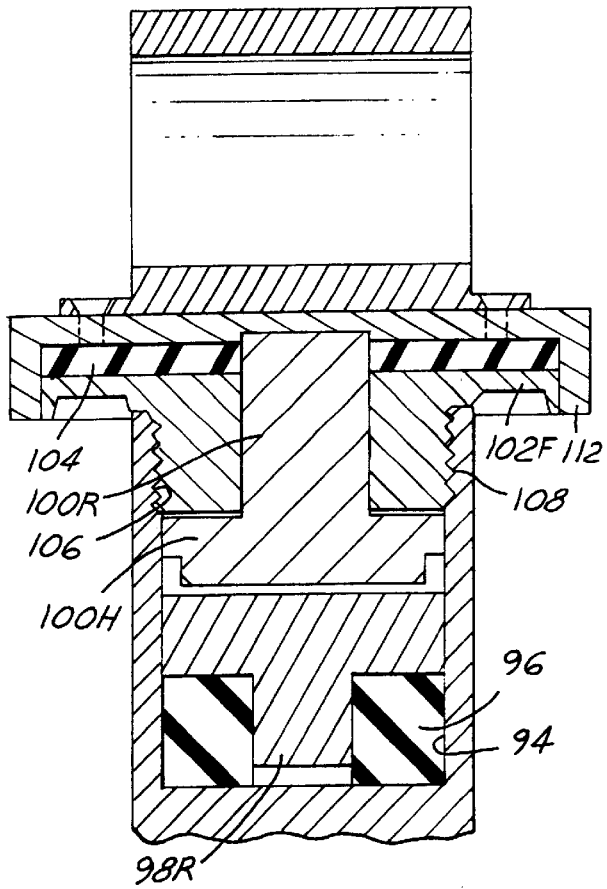
FIG. 6 is an enlarged cross section view in the direction of arrows 6—6 in FIG. 5.

FIGS. 5 and 6 show the connecting rod 82 of a third piston/connecting rod embodiment 80 for endowing an engine with a variable compression ratio. Connecting rod 82 comprises a large end 84 for journaling on a crank pin of a crankshaft (not shown) and a small end 86 for journaling on a central portion of a wrist pin (also not shown) for coupling the connecting rod to the piston (also not shown). A variable length mechanism 88 is embodied in the connecting rod between its large and small ends to provide for variation in overall length between the large and small ends.

Connecting rod 82 comprises a first part 90 containing large end 84 and a second part 92 containing small end 86. The end of part 90 opposite large end 84 comprises a blind hole 94. Mechanism 88 comprises a first elastomeric mass 96, a control plug 98, a control ram 100, a lower retainer 102, and a second elastomeric mass 104.

Elastomeric mass 96 comprises a flat ring of relatively higher modulus of elasticity disposed at the bottom of hole 94. Control plug 98 comprises a head 98H that is disposed within hole 94 over elastomeric mass 96 and a rod 98R that is disposed within a central through-hole of the elastomeric mass.

Control ram 100 comprises a head 100H disposed within hole 94 above head 98H of control plug 98 and a rod 100R that extends upwardly out of hole 94. The upper end of hole 94 contains a female screw thread 106. Lower retainer 102 comprises a shank containing a male screw thread 108 that is threaded to screw thread 106 to fasten lower retainer 102 to connecting rod part 90. Lower retainer 102 comprises a central through-hole through which rod 100R of control ram 100 passes. Lower retainer 102 is tightened fast to part 90 capturing head 100H of control ram 100 within hole 94. FIGS. 5 and 6 show the condition where both elastomeric masses are relaxed, giving connecting rod 82 maximum free length for maximum compression ratio.

The axial dimensions of elastomeric mass 96, head 100H, and head 102H are chosen in relation to the axial distance between the bottom of hole 94 and the lower retainer shank such that when both elastomeric masses are relaxed, head 100H is spaced axially a certain distance from head 98H. Also, the axial dimension of elastomeric mass 96 is larger than axial dimension of control plug rod 98R so that the distal end of the control plug rod is spaced a certain distance from the bottom of hole 94.

Lower retainer 102 further comprises a flange 102F external to hole 94. Small end 86 comprises a top retainer 112 that fits telescopically over flange 102F. Elastomeric mass 104 is disposed between confronting surfaces of flange 102F and top retainer. Mass 104 is shown as a flat ring having a central through-hole through which the distal end of control ram rod passes. Part is centrally fastened to the distal end of the control ram rod. Connecting rod 82 contains an oil supply passage 116 through which lubrication may be delivered to a central region of mechanism 88 at the bottom of hole 94, and an oil return passage 118 for carrying oil away.

Figure 7:
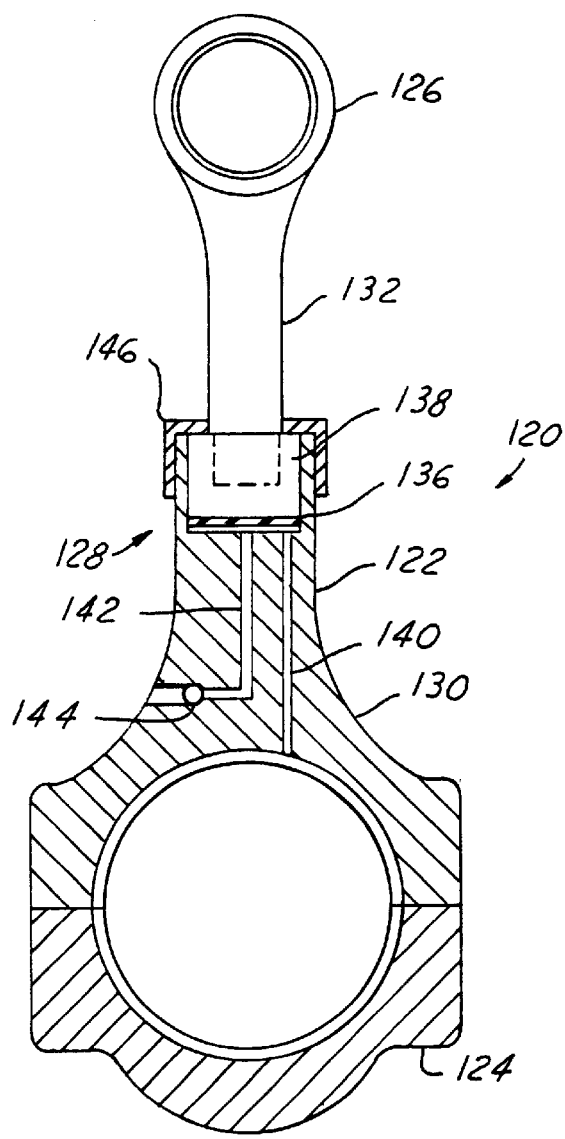
FIG. 7 is a view in the same direction as the view of FIG. 1 showing a connecting rod constituting a fourth embodiment.
Figure 8:
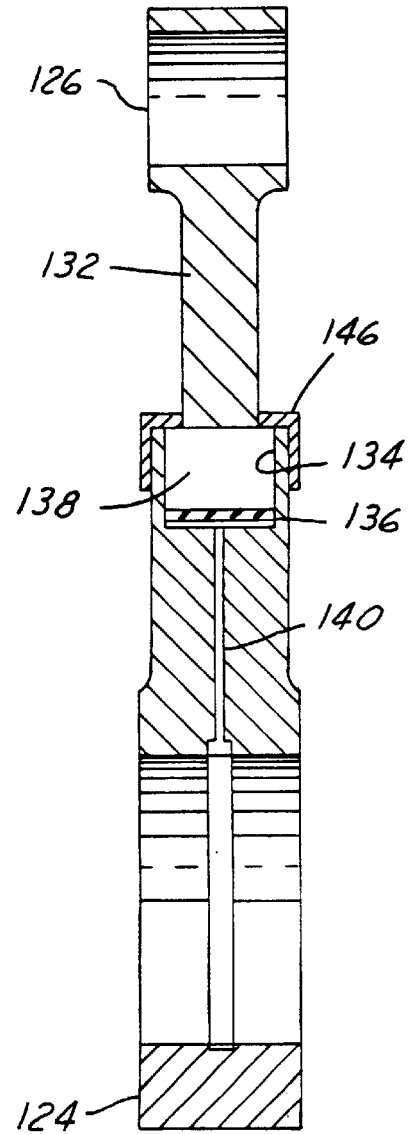
FIG. 8 is a cross section view in the direction of arrows 8—8 in FIG. 7.

FIGS. 7 and 8 show the connecting rod 122 of a fourth piston/connecting rod embodiment 120 for endowing an engine with a variable compression ratio. Connecting rod 122 comprises a large end 124 for journaling on a crank pin of a crankshaft (not shown) and a small end 126 for journaling on a central portion of a wrist pin (also not shown) for coupling the connecting rod to the piston (also not shown). A variable length mechanism 128 is embodied in the connecting rod between its large and small ends to provide for variation in overall length between the large and small ends.

Connecting rod 122 comprises a first part 130 containing large end 124 and a second part 132 containing small end 126. The end of part 130 opposite large end 124 comprises a blind hole 134. Mechanism 128 comprises an elastomeric mass 136 and a piston 138. An end of part 132 opposite small end 126 is fastened tight to piston 138. Piston 138 fits closely within hole 134. Elastomeric mass 136 is disposed within hole 134 below piston 136.

Part 130 contains an oil supply passage 140 through which lubrication may be delivered to a space within hole 134 below elastomeric mass 136. Part 130 also contains an oil return passage 142, including a check 144, for carrying oil away. A cap 146 that has a clearance hole for part 132 is fastened to part 130 in closure of the open end of hole 134. Piston 134 is thus capable of limited travel within hole 134 to change the effective overall length, and hence change the compression ratio.

While a presently preferred embodiment has been illustrated and described, it is to be appreciated that the invention may be practiced in various forms within the scope of the following claims.

What is claimed is:

1. A variable length-piston and connecting rod assembly for imparting a variable compression ratio to an internal combustion engine, the assembly comprising:

a first part and a second part that are coupled by a variable length mechanism that is captured between the parts;

the first part comprising a blind hole;

an elastomeric mass comprising a ring disposed in the blind hole;

a first piston comprising a head disposed in the blind hole above the elastomeric ring and a stem that passes through the ring;

a second piston comprising a head disposed in the blind hole above the head of the first piston;

a closure closing the blind hole to capture the heads of the pistons but comprising a central through-hole;

the second piston comprising a stem that passes from its head through the closure through-hole to attach to the second part; and an elastomeric mass captured axially between the second part and the closure.

2. A variable length piston and connecting rod assembly for imparting a variable compression ratio to an internal combustion engine, the assembly comprising:

a first part and a second part that are coupled by a variable length mechanism that is captured between the parts;

the first part comprising a blind hole;

an elastomeric mass disposed in the blind hole;

a piston disposed in the blind hole above the elastomeric mass;

a closure closing the blind hole to capture the piston but comprising a central through-hole;

the second part passing through the closure through-hole to attach to the piston; and oil passages for supplying oil to, and returning oil from, a space in the blind hole below the elastomeric mass.

3. A variable length piston and connecting rod assembly for imparting a variable compression ratio to an internal combustion engine, the assembly comprising:

a first part and a second part that are coupled by a variable length mechanism that is captured between the parts;

the first part comprising a blind hole for containing elements of the variable length mechanism;

the variable length mechanism comprising first and second elements contained within the blind hole and effective to move the first and second parts to vary the length of the assembly, wherein one of the elements is an elastomeric mass;

and an oil passage in one of the parts for delivering oil under pressure into the blind hole.

4. A variable length piston and connecting rod assembly as set forth in claim 3 wherein the oil passage is arranged to direct oil under pressure onto at least the elastomeric mass.

* * * * *